United States Patent [19]

Imae et al.

[11] Patent Number: 5,449,709
[45] Date of Patent: Sep. 12, 1995

[54] RESIN COMPOSITION FOR LENS BASED MATERIALS

[75] Inventors: Yoshio Imae; Kazunobu Sato, both of Hiratsuka, Japan

[73] Assignee: Mitsubishi Gas Chemical Company, Inc., Tokyo, Japan

[21] Appl. No.: 263,476

[22] Filed: Jun. 22, 1994

[30] Foreign Application Priority Data

Jul. 2, 1993 [JP] Japan ................ 5-164732

[51] Int. Cl.6 .................................. C08K 5/50
[52] U.S. Cl. ........................... 524/154; 524/912
[58] Field of Search ............ 524/154, 910, 911, 912, 524/913; 522/15

[56] References Cited

U.S. PATENT DOCUMENTS 4,005,057  1/1977  Singh et al. .................. 524/912

FOREIGN PATENT DOCUMENTS

| | | |
|---|---|---|
| 382957 | 8/1980 | European Pat. Off. . |
| 53-112949 | 10/1978 | Japan . |
| 62-230835 | 10/1987 | Japan . |
| 64-62336 | 3/1989 | Japan . |
| 03-43440 | 2/1991 | Japan . |
| 03-081362 | 4/1991 | Japan . |
| 03-81363 | 4/1991 | Japan . |
| 04-13748 | 1/1992 | Japan . |
| 1044973 | 10/1966 | United Kingdom . |

*Primary Examiner*—Veronica P. Hoke
*Attorney, Agent, or Firm*—Frishauf, Holtz, Goodman, Langer & Chick

[57] ABSTRACT

An antistatic resin composition is herein disclosed which comprises (A) 100 parts by weight of a methyl methacrylate-styrene copolymer resin, (B) 0.3 to 3 parts by weight of a phosphonium sulfonate, and if necessary, (C) 0.3 to 3 parts by weight of an aliphatic or an aromatic ester having 6 to 34 carbon atoms. Furthermore, a resin composition further containing a light diffuser can be applied to a Fresnel lens sheet or a light cover sheet.

The above resin composition is excellent in appearance properties, optical properties such as a total light transmittance, which is usually 88% or more, antistatic properties such as the prevention of dust adhesion and transparency without the deterioration of mechanical properties.

14 Claims, No Drawings

RESIN COMPOSITION FOR LENS BASED MATERIALS

BACKGROUND OF THE INVENTION

1. Field of the Invention

The present invention relates to an antistatic resin composition, and specifically, it relates to a methyl methacrylate-styrene copolymer resin composition having antistatic properties as well as excellent appearance properties, optical properties and transparency. More specifically, it relates to a methyl methacrylate-styrene copolymer resin composition suitable for Fresnel lens sheets and light cover sheets for electronic and electric equipments which are threatened with the adhesion of dust and the like thereon.

2. Description of Related Arts

As techniques for imparting antistatic properties to a thermoplastic resin composition, various methods have heretofore been disclosed. For example, as disclosed in Japanese Patent Publication No. 37414/1989, there are known anionic surface active agents such as alkyl phosphates and polyoxyethylene alkylphosphate, and cationic surface active agents such as quaternary ammonium salts as substances capable of imparting the antistatic properties to the surface of the thermoplastic resin composition. However, these antistatic agents lave a drawback that the effect is not durable owing to their low molecular weight.

A technique of adding a substance having the antistatic properties to the thermoplastic resin composition is also disclosed in the above-mentioned publication, and as the main antistatic agents, there are known nonionic surface active agents such as polyoxyethylene alkyl ethers, polyoxyethylene alkylamino ethers and alkyl diethanoiamides. However, these nonionic surface active agents have a lower antistatic effect than the ionic surface active agents.

Furthermore, Japanese Patent Application Laid-open No. 43440/1991 discloses a method for kneading a hygroscopic compound and an antistatic agent into an acrylic resin or the like, a method for coating the resin with a surface active agent, and another method. However, the above-mentioned kneading method has a problem that appearance properties deteriorate because of poor compatibility, bad dispersion properties, the bleeding-out of the antistatic agent on the surface of the polymer material and the like.

In addition, in Japanese Patent Application Laid-open Nos. 230835/1987 and 62336/1989, it is disclosed that a phosphonium sulfonate is used as the antistatic agent in a thermoplastic resin, for example, a polyolefin such as polyethylene or polypropylene, polystyrene, polymethyl methacrylate, polycarbonate, polyethylene terephthalate, polybutylene terephthalate or polycaprolactam. In this case, the good antistatic effect can be obtained, and an inconvenience such as the bleeding-out of the antistatic agent on the high molecular material surface can be eliminated.

However, in the composition obtained by adding the phosphonium sulfonate as the antistatic agent to the thermoplastic resin which is described in Japanese Patent Application Laid-open Nos. 230835/1987 and 62336/1989, both of its total light transmittance and refractive index are not always high, and for this reason, the above-mentioned composition has not been applicable to the field of lens base materials for projection TVs in which the high total light transmittance and refractive index are required.

However, with regard to a composition obtained by adding and blending a phosphonium sulfonate as an antistatic agent to and with a thermoplastic resin such as a polycarbonate suitable for an optical use which is mentioned in the above-mentioned Japanese Patent Application Laid-open Nos. 230835/1987 and 62336/1989, an appearance failure such as whitening and the deterioration of the total light transmittance take place at the time of the manufacture of sheets.

A methyl methacrylate-styrene copolymer resin has been used in various fields because of its excellent characteristics such as high stiffness, high refractive index and low hygroscopicity, but it is devoid of the antistatic properties. On this account, restriction is put on the application of the copolymer resin to the optical field of electric appliances such as Fresnel lenses and light covers whose demand increases year by year.

SUMMARY OF THE INVENTION

The present inventors have intensively researched with the intention of overcoming the drawbacks of the above-mentioned conventional methods, and as a result, it has been found that a resin composition having excellent antistatic properties, a high total light transmittance and a high refractive index can be obtained by using a methyl methacrylate-styrene copolymer resin as a thermoplastic resin and a phosphonium sulfonate as an antistatic agent for the resin. In addition, it has also been found that when an aliphatic ester or an aromatic ester compound is further blended as a lubricant when necessary, a resin composition having the improved antistatic properties, appearance properties, optical properties and transparency can be obtained. Moreover, it has been found that a resin composition obtained by blending the above-mentioned resin composition with the fine particles of an inorganic compound or a crosslinked organic polymer as a light diffuser is excellent as a material for Fresnel lens sheets and light cover sheets. The present invention has been completed on the basis of such knowledge. That is to say, the present invention is directed to:

(1) an antistatic resin composition (resin composition I) comprising (A) 100 parts by weight of a methyl methacrylate-styrene copolymer resin in which a weight ratio of a methyl methacrylate unit to a styrene unit which are monomer units is in the range of 20:80 to 80:20, and (B) 0.3 to 3 parts by weight of a phosphonium sulfonate, (2) an antistatic resin composition (resin composition II) comprising (A) 100 parts by weight of the aforesaid methyl methacrylate-styrene copolymer resin, (B) 0.3 to 3 parts by weight of a phosphonium sulfonate, and (C) 0.3 to 3 parts by weight of an aliphatic or an aromatic ester having 6 or more carbon atoms, (3) an antistatic resin composition (resin composition III) comprising (A) 100 parts by weight of the aforesaid methyl methacrylate-styrene copolymer resin, (B) 0.3 to 3 parts by weight of a phosphonium sulfonate, and (D) 0.05 to 2 parts by weight of the fine particles of an inorganic compound as a light diffuser, (4) an antistatic resin composition (resin composition IV) comprising (A) 100 parts by weight of the aforesaid methyl methacrylate-styrene copolymer resin, (B) 0.3 to 3 parts by weight of a phosphonium sulfonate, and (E) 0.05 to 20 parts by weight of the fine particles of a crosslinked organic polymer as a light diffuser, (5) an antistatic resin composition (resin composition V) comprising (A) 100 parts by weight of the aforesaid methyl methacrylate-styrene copolymer resin, (B) 0.3 to 3 parts by weight of a phosphonium sulfonate, (C) 0.3 to 3 parts by weight of an aliphatic or an aromatic ester having 6 or more carbon atoms, and (D) 0.05 to 2 parts by weight of the fine particles of an inorganic compound as a light diffuser, (6) an antistatic resin composition (resin composition VI) comprising (A) 100 parts by weight of the aforesaid methyl methacrylate-styrene copolymer resin, (B) 0.3 to 3 parts by weight of a phosphonium sulfonate, (C) 0.3 to 3 parts by weight of an aliphatic or an aromatic ester having 6 or more carbon atoms, and (E) 0.05 to 20 parts by weight of the fine particles of a crosslinked organic polymer as a light diffuser, and (7) a Fresnel lens sheet or a light cover sheet which comprises any one of the above-mentioned resin compositions I to VI.

DESCRIPTION OF PREFERRED EMBODIMENT

In a composition of the present invention, a methyl methacrylate-styrene copolymer resin which is a component (A) (hereinafter sometimes referred to as "MS copolymer resin") is constituted of 20 to 80%, preferably 50 to 70% by weight of a methyl methacrylate unit and 80 to 20%, preferably 50 to 30% by weight of a styrene unit which are monomer units. This MS copolymer resin can be prepared by copolymerizing methyl methacrylate and styrene in such a ratio as to correspond to the above-mentioned ratio of the monomer units. No particular restriction is put on the weight-average molecular weight of this MS copolymer resin, but it is preferably in the range of 100000 to 200000 from the viewpoints of extrusion kneading properties and physical properties.

In obtaining the copolymer resin, if the monomer blend ratio of methyl methacrylate is less than 20% by weight, mechanical properties such as strength and flexural strength deteriorate. On the other hand, if the monomer blend ratio of methyl methacrylate is more than 80% by weight, the refractive index of the obtained resin deteriorates, and the formation of pellets therefrom is difficult in a certain case.

It is suitable that the monomer blend ratio of methyl methacrylate to styrene is selected so that the refractive index of the obtained resin compositions I to VI may be in the range of 1.50 to 1.57, in the case that these compositions are used for various optical equipments.

Furthermore, in molding films or sheets by extrusion, the weight-average molecular weight of the MS copolymer resin is suitably in the range of about 100000 to 200000 also for the purpose of obtaining a preferable melting viscosity under molding temperature conditions.

Next, as a phosphonium sulfonate which is the component (B) in the composition of the present invention, various compounds are usable, but they are usually represented by the general formula (1):

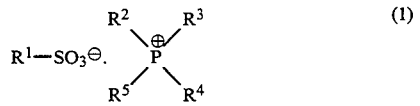

(1)

wherein $R^1$ is an alkyl group or an alkylaryl group having 8 to 22 carbon atoms; and $R^2$ to $R^5$ are each a hydrogen atom, an alkyl group having 1 to 10 carbon atoms or an aryl group and may be the same or different.

The phosphonium sulfonate (B) in the present invention is constituted of organic sulfonate anions and organic phosphonium cations.

Typical examples of the organic sulfonate anions include docosyl sulfonate, tetracosyl sulfonate and a mixture thereof.

Typical examples of the organic phosphonium cations include aliphatic phosphoniums such as tetramethylphosphonium, tetraethylphosphonium, tetrabutylphosphonium, triethylmethylphosphonium, tributylmethylphosphonium, trioctylmethylphosphonium, trimethylbutylphosphonium, trimethyloctylphosphonium, trimethyllaurylphosphonium, trimethylstearylphosphonium, triethyloctylphosphonium and tributyloctylphosphonium; aromatic phosphoniums such as triphenylmethylphosphonium and triphenylethylphosphonium; and alkylarylphosphoniums such as triphenylbenzylphosphonium and tributylbenzylphosphonium.

In addition thereto, aliphatic phosphoniums having substituents can also be used as the organic phosphonium cations. Additional examples of the aliphatic phosphoniums include tetramethylolphosphonium, tri(2-cyanoethyl)methylphosphonium, tri(2-cyanoethyl)ethylphosphonium, trimethyl(2-hydroxyethyl)phosphonium and tributyl(2-hydroxyethyl)phosphonium, and additional examples of the aromatic phosphoniums include tri(2-cyanoethyl)benzylphosphonium and tri(3-hydroxypropyl)benzylphosphonium. Of the phosphonium sulfonates enumerated above as the examples of the general formula (1), compounds represented by the general formula (2) are particularly preferable:

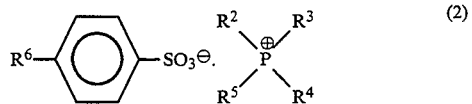

(2)

wherein $R^6$ is an alkyl group having 2 to 16 carbon atoms; and $R^2$ to $R^5$ are each a hydrogen atom, an alkyl group having 1 to 10 carbon atoms or an aryl group and may be the same or different.

The phosphonium sulfonate which can be used in the present invention is constituted of an optional combination of the organic sulfonate anions and the organic phosphonium cations, but the present invention should not be limited by them.

In the composition of the present invention, the blend ratio of the phosphonium sulfonate (B) is in the range of 0.3 to 3 parts by weight, preferably 0.8 to 2 parts by weight based on 100 parts by weight of the MS copolymer resin which is the component (A). If the blend ratio of the phosphonium sulfonate is less than 0.3 part by weight, a sufficient antistatic effect cannot be obtained, and if it is more than 3 parts by weight, the phosphonium sulfonate is so viscous that mixing the same with the MS copolymer resin is difficult. In consequence, slip characteristics are poor at the raw material feed portion of an extruder, so that extrusion stability unpreferably deteriorates.

In the present invention, when an aliphatic or an aromatic ester (C) as a lubricant is blended with the MS copolymer resin (A) and the phosphonium sulfonate (B), the improvement effect of optical properties such as a total light transmittance and a yellow index (YI value) can be obtained, and when the amount of the phosphonium salt to be used is decreased, the improvement effect of the extrusion stability can be obtained.

The blend ratio of the ester compound (C) is in the range of 0.3 to 3 parts by weight based on 100 parts by weight of the MS copolymer resin (A).

The ester compound in the present invention is an aliphatic or an aromatic ester having 6 to 34 carbon atoms, preferably 6 to 22 carbon atoms and this compound is preferably a glyceride of an aliphatic or an aromatic carboxylic acid having 6 to 34 carbon atoms, preferably 6 to 22 carbon atoms. Particularly, monoglyceride stearate is optimum.

In the case where the resin composition of the present invention is used as a Fresnel lens sheet or a light cover sheet, it is effective to add a light diffuser to the components (A) and (B), or the components (A), (B) and (C).

Examples of the usable light diffuser include the fine particles of inorganic compounds (D) such as barium sulfate, calcium carbonate, crystalline silica, amorphous silica and glass as well as the fine particles of crosslinked organic polymers (E) such as methacrylic copolymer, styrene copolymer, polycarbonate copolymer and vinyl chloride copolymer.

The most preferable light diffuser is barium sulfate.

The use ratio of the light diffuser is in the range of 0.05 to 2 parts by weight based on 100 parts by weight of the MS copolymer resin (A) in the case of the fine particles of the inorganic compound (D), or in the range of 0.05 to 20 parts by weight in the case of the fine particles of the crosslinked organic polymer (E).

If the blend ratio of the light diffuser is less than the above-mentioned range, the effect on the light diffusion properties is low, and on the other hand, if it is more than the above-mentioned range, transparency inconveniently deteriorates. No particular restriction is put on the particle diameter of the inorganic compound (D) and the crosslinked organic polymer (E), but it is preferably selected in the range of 1 to 100 μm.

The antistatic resin composition of the present invention can be blended, as desired, with various additives such as a stabilizer, a pigment, a dye, a flame retardant and a lubricant, and a filler such as glass beads.

The resin composition of the present invention can be prepared by a conventional known process, and, for example, there can be utilized a process in which a mixture obtained by dry blending or by the use of a supermixer is kneaded by an extruder.

For the manufacture of the final molded articles of the antistatic resin composition according to the present invention, a usual molding means such as injection molding, extrusion, blow molding or compression molding can be applied.

The antistatic resin composition according to the present invention is excellent in appearance properties, optical properties such as a total light transmittance, which is usually 88% or more, antistatic properties such as the prevention of dust adhesion and transparency without the deterioration of mechanical properties. The particularly preferable resin composition of the present invention has a flexural modulus of 30000 to 38000 kg/cm$^2$, a refractive index of 1.50 to 1.57 and a water absorption of 0.05 to 0.25% by weight.

The above-mentioned resin composition of the present invention is suitably utilized for the Fresnel lens sheets and the light cover sheets for electronic and electric equipments.

Next, the present invention will be described in more detail with reference to non-limitative examples.

Evaluation was made in accordance with the following procedures.

(1) Appearance properties were evaluated by visual comparison on the basis of a blank sheet (comprising a synthetic polymer alone containing no antistatic agent).

The symbol ○ denotes a sample having transparency, no sink mark and no rib, and the symbol × denotes a sample having fogging, sink mark and rib.

(2) The yellow index (YI value) was measured in accordance with a transmission method by the use of a color difference meter (model: Z-Σ 80) made by Nippon Denshoku Industry Co., Ltd.

(3) A surface specific resistance was measured as follows: Immediately after molding, a molded plate was allowed to stand for 24 hours in a thermostatic chamber at 23° C. and a humidity of 50%, and afterward, the surface specific resistance of the molded plate was measured by the use of a superinsulation-resistance meter made by Kawaguchi Electric Works Co., Ltd.

(4) A total light transmittance was measured by the use of a haze meter (model: NDH) made by Nippon Denshoku Industry Co., Ltd.

EXAMPLES 1 TO 6

A methyl methacrylate-styrene copolymer resin (MS copolymer resin) made into pellets having a weight-average molecular weight of 150000 obtained by copolymerizing a monomer mixture comprising 64% by weight of methyl methacrylate and 36% by weight of styrene was blended with a tetraalkylphosphonium (an alkyl moiety has an average number of carbon atoms of 4) alkylbenzenesulfonate (an alkyl moiety has an average number of carbon atoms of 12) as an antistatic agent represented by the above-mentioned general formula (2) in each ratio shown in Table 1, and they were stirred and mixed by a supermixer, and then molten, kneaded and extruded at a resin temperature of 220° C. by using a vent-type 45 mm diameter twin-screw extruder to form pellets. Next, test pieces were made at a resin temperature of 225° C. by using a vent-type 65 mm diameter sheet extruder, and various physical properties were then measured.

The measured results are shown in Tables 1 and 2.

Comparative Example 1

Test pieces were made by the same procedure as in Example 1 except that the methyl methacrylate-styrene copolymer resin used in Example 1 was singly employed without any antistatic agent, and various physical properties were then measured. The measured results are shown in Table 2.

Comparative Example 2

Test pieces were made by the same procedure as in Example 1 except that the methyl methacrylate-styrene copolymer resin used in Example 1 was blended with sodium dodecylsulfonate as an antistatic agent in a ratio shown in Table 2, and various physical properties were then measured. The measured results are shown in Table 2.

Comparative Example 3

Test pieces were made by the same procedure as in Example 1 except that the methyl methacrylate-styrene copolymer resin used in Example 1 was blended with monoglyceride stearate as a lubricant in a ratio shown in Table 2, and various physical properties were then measured. The measured results are shown in Table 2.

TABLE 1

| | Example | | | | |
|---|---|---|---|---|---|
| | 1 | 2 | 3 | 4 | 5 |
| Blend Composition (pts. wt.) | | | | | |
| MS Copolymer Resin | 100 | 100 | 100 | 100 | 100 |
| Phosphonium Sulfonate | 0.4 | 1 | 2 | 3 | 1.0 |
| Monoglyceride Stearate | — | — | — | — | 0.8 |
| Thickness (mm) | 1.5 | 1.5 | 1.5 | 1.5 | 1.5 |
| Appearance Properties | ○ | ○ | ○ | ○ | ○ |
| Yellow Index (YI value) | 3 | 5 | 8 | 11 | 5 |
| Surface Specific Resistance (Ω) | $10^{15}$ | $10^{15}$ | $10^{13}$ | $10^{12}$ | $10^{13}$ |
| Total Light Transmittance (%) | 91 | 90 | 89 | 88 | 90 |

TABLE 2

| | Example 6 | Comp. Example 1 | Comp. Example 2 | Comp. Example 3 |
|---|---|---|---|---|
| Blend Composition (pts. wt.) | | | | |
| MS Copolymer Resin | 100 | 100 | 100 | 100 |
| Sodium Dodecylsulfonate | — | — | 0.5 | — |
| Phosphonium Sulfonate | 1.5 | — | — | — |
| Monoglyceride Stearate | 0.5 | — | — | 0.5 |
| Thickness (mm) | 1.5 | 1.5 | 1.8 | 1.5 |
| Appearance Properties | ○ | ○ | X | ○ |
| Yellow Index (YI value) | 6 | 1 | — | 2 |
| Surface Specific Resistance (Ω) | $10^{13}$ | $>10^{16}$ | $10^{11}$ | $10^{16}$ |
| Total Light Transmittance (%) | 90 | 92 | 83 | 91 |

What is claimed is:

1. A resin composition for an optical lens which comprises (A) 100 parts by weight of a methyl methacrylate-styrene copolymer resin in which a weight ratio of a methyl methacrylate unit to a styrene unit which are monomer units is 70:30 to 50:50, (B) 0.3 to 3 parts by weight of a phosphonium sulfonate, (C) 0.3 to 3 parts by weight of an aliphatic carboxylic acid ester or an aromatic carboxylic acid ester, said carboxylic acid ester having 6 to 34 carbon atoms, and (D) 0.05 to 2 parts by weight of fine particles of an inorganic compound as a light diffuser.

2. The resin composition for lens based materials according to claim 1, wherein the methyl methacrylate-styrene copolymer resin which is the component (A) has a weight-average molecular weight of 100000 to 200000, said composition having a flexural modulus of 30000 to 38000 kg/cm², a refractive index of 1.50 to 1.57 and a water absorption of 0.05 to 0.25% by weight.

3. The resin composition for lens based materials according to claim 1, wherein the phosphonium sulfonate (B) is a compound of the formula (2):

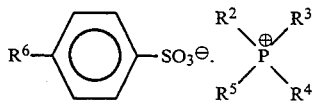

(2)

wherein $R^6$ is an alkyl group having 2 to 16 carbon atoms; and $R^2$ to $R^5$ are each a hydrogen atom, an alkyl group having 1 to 10 carbon atoms or an aryl group and may be the same or different.

4. The resin composition for lens based materials according to claim 1 wherein the phosphonium sulfonate (B) is selected from the group consisting of tetramethylphosphonium, tetraethylphosphonium, tetrabutylphosphonium, triethylmethylphosphonium, tributylmethylphosphonium, trioctylmethylphosphonium, trimethylbutylphosphonium, trimethyloctylphosphonium, trimethyllaurylphosphonium, trimethylstearylphosphonium, triethyloctylphosphonium, tributyloctylphosphonium, triphenylmethylphosphonium, triphenylethylphosphonium, triphenylbenzylphosphonium, tributylbenzylphosphonium, tetramethylolphosphonium, tri(2-cyanoethyl)methylphosphonium, tri(2-cyanoethyl)ethylphosphonium, tri(2-cyanoethyl)benzylphosphonium, tri(3-hydroxypropyl)benzylphosphonium, trimethyl(2-hydroxyethyl)phosphonium and tributyl(2-hydroxyethyl)phosphonium.

5. In a Fresnel lens sheet or a light cover sheet wherein the improvement comprises said sheet being made of a resin composition set forth in any one of claims 1, 2 and 3.

6. The resin composition for an optical lens according to claim 1 or 2, wherein the aliphatic carboxylic acid ester or the aromatic carboxylic acid ester having 6 to 34 carbon atoms which is the component (C) is selected from the group consisting of (i) a glyceride-based aliphatic ester having 6 to 34 carbon atoms comprising an aliphatic carboxylic acid and glycerin and (ii) a glyceride-based aromatic ester having 6 to 34 carbon atoms comprising an aromatic carboxylic acid and glycerin.

7. The resin composition for an optical lens according to claim 1, wherein said (C) is a glyceride of an aliphatic carboxylic acid ester having 6 to 22 carbon atoms or an aromatic carboxylic acid ester having 6 to 22 carbon atoms.

8. The resin composition for lens based materials according to claim 7, wherein said (C) is monoglyceride stearate.

9. The resin composition for lens based materials according to claim 1, wherein the phosphonium sulfonate is in an amount of 0.8 to 2 parts by weight based on 100 parts by weight of the methyl methacrylate-styrene copolymer resin.

10. The resin composition for lens based materials according to claim 9, wherein said (D) is selected from the group consisting of barium sulfate, calcium carbonate, crystalline silica, amorphous silica and glass.

11. The resin composition for lens based materials according to claim 10, wherein the particles of the inorganic compound have a particle diameter of 1 to 100 μm.

12. The resin composition for lens based materials according to claim 11, wherein the inorganic compound is barium sulfate.

13. The resin composition for lens based materials according to claim 12, wherein said (C) is monoglyceride stearate.

14. The resin composition for lens based materials according to claim 4, wherein said (C) is monoglyceride stearate; the phosphonium sulfonate is in an amount of 0.8 to 2 parts by weight based on 100 parts by weight of the methyl methacrylate-styrene copolymer resin; and the inorganic compound is barium sulfate having a particle diameter of 1 to 100 μm.

* * * * *